United States Patent [19]
Smith

[11] 3,815,869
[45] June 11, 1974

[54] BUTTERFLY DISC VALVES

[75] Inventor: Ronald Gordon Smith, Norfolk, England

[73] Assignee: Sir W. H. Bailey & Co. Limited, Manchester, England

[22] Filed: Feb. 20, 1973

[21] Appl. No.: 334,109

[30] Foreign Application Priority Data
Feb. 24, 1972  Great Britain...................... 8509/72

[52] U.S. Cl................................. 251/306, 251/175
[51] Int. Cl........................................... F16k 1/228
[58] Field of Search....... 251/306, 84, 88, 173, 175, 251/315

[56] References Cited
UNITED STATES PATENTS 3,556,476   1/1971   Haenky................................ 251/306
3,593,960   7/1971   Scaramocci......................... 251/306
3,705,707   7/1971   Scaramocci........................... 251/84

Primary Examiner—William R. Cline
Attorney, Agent, or Firm—Cushman, Darby & Cushman

[57] ABSTRACT

A fluid-flow control valve comprising a body having a passageway therethrough, a butterfly disc mounted in said body and rotatable to and from a position closing said passageway, and an annular seating on the body and an annular face on the butterfly disc for sealing together when the butterfly disc closes the passageway, one of said seating and said face being formed of two side-by-side annular portions of dissimilar materials and the butterfly disc being displaceable along the passageway whereby the butterfly disc will close the passageway even if one of said dissimilar material is destroyed.

11 Claims, 4 Drawing Figures

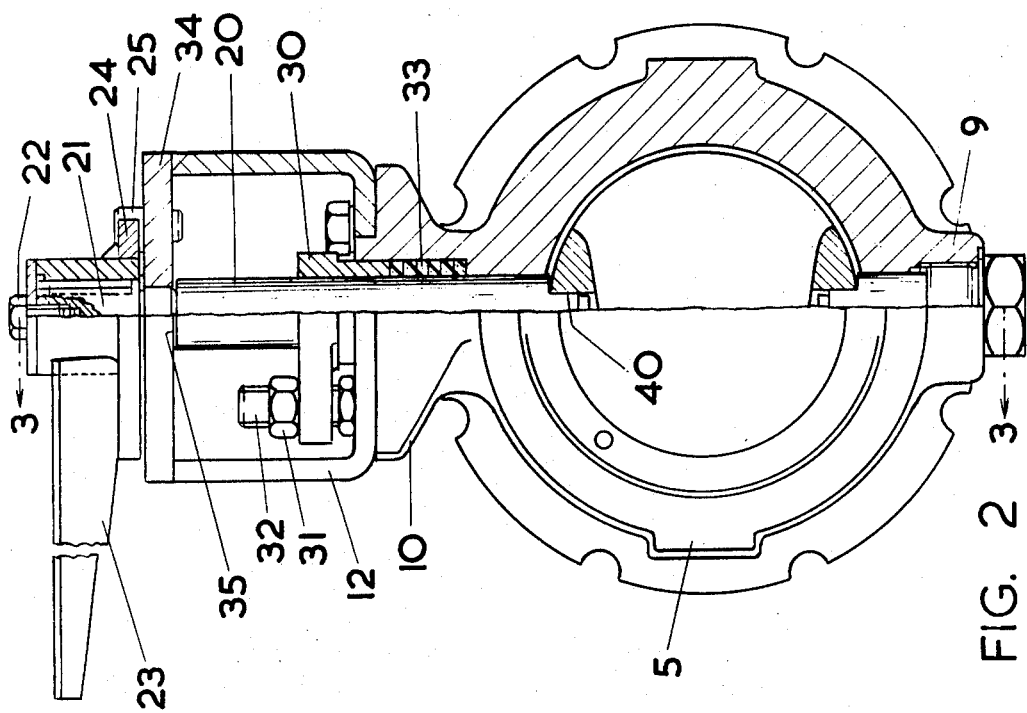
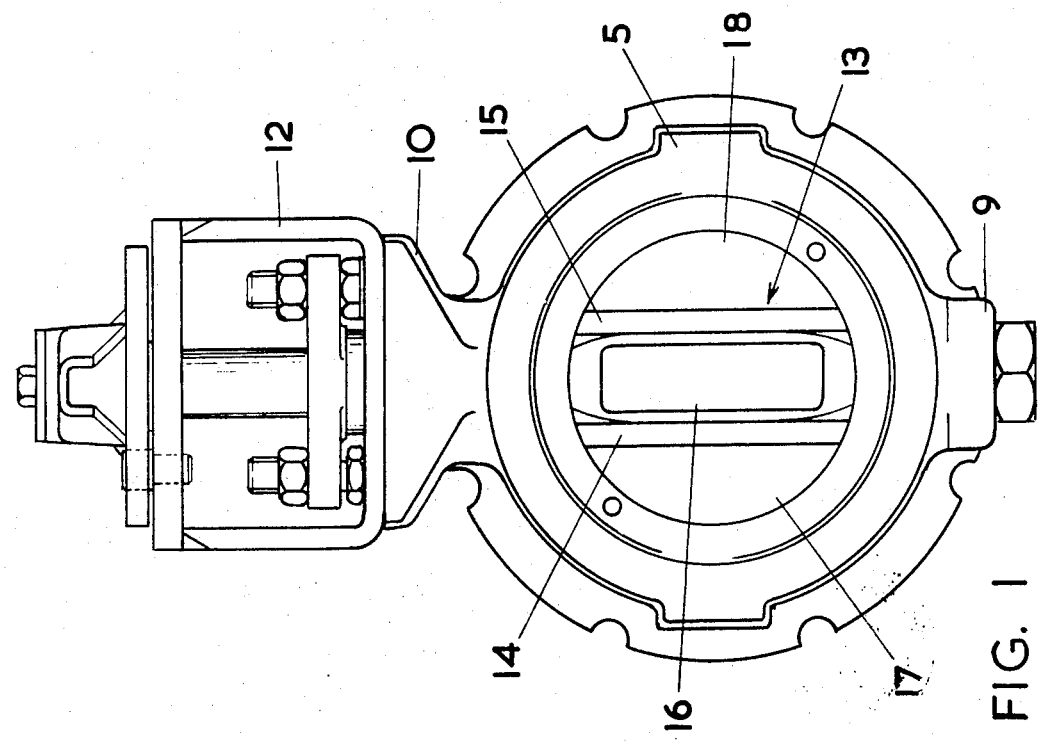
FIG. 1
FIG. 2

BUTTERFLY DISC VALVES

BACKGROUND OF THE INVENTION

This invention relates to improvements in and relating to fluid flow control valves. The invention is particularly concerned with butterfly valves.

It is an object of the present invention to provide a fluid flow control valve which is capable of withstanding service conditions which would otherwise prevent it from being operative. A typical one of such service conditions is that of elevated temperature, for example above about 250°C.

SUMMARY OF THE INVENTION

In accordance with the present invention, a fluid flow control valve comprises a body having a passageway therethrough, a butterfly disc mounted in said body and rotatable to and from a position closing said passageway, and an annular seating on the body and an annular face on the butterfly disc for sealing together when the butterfly disc closes the passageway, one of said seating and said face being formed of two side-by-side annular portions of dissimilar materials and the butterfly disc being displaceable along the passageway whereby the butterfly disc will close the passageway even if one of said dissimilar materials is destroyed.

Preferably, one of the dissimilar materials is a plastic material and the other dissimilar material is a metal.

Preferably also, the plastic material is polytetrafluoroethylene (ptfe).

Preferably also, the body and the butterfly disc are provided with two sets of sealing seatings and faces, one set being located to each side of the butterfly disc.

BRIEF DESCRIPTION OF THE DRAWINGS

A typical embodiment, and a modification thereof, of a fluid flow control valve will now be more particularly described with reference to the accompanying drawings in which:

FIG. 1 is a front elevation of the valve with a passageway therethrough open to the flow of fluid;

FIG. 2 is a front elevation of the valve of FIG. 1 which is shown partly in cross-section along the line 2—2 of FIG. 3, the valve being in the closed position;

DESCRIPTION OF THE PREFERRED EMBODIMENTS

Figure 3:
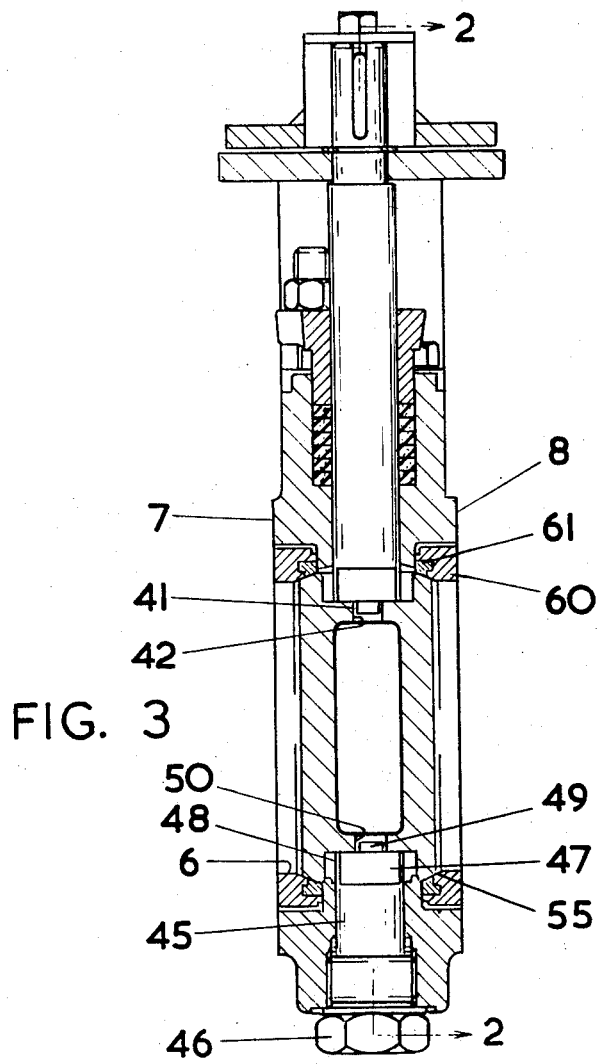
FIG. 3 is a cross-sectional view of the valve taken along the line 3—3 of FIG. 2.

Referring initially to FIGS. 1 to 3, these show a body 5 of annular construction, the body 5 being provided with a circular passageway 6 extending therethrough from one face 7 to the other face 8 for the flow of fluid through the valve. The body 5 is provided with a lower circular boss 9 for a purpose to be described, and with an upper extension 10 upon which is affixed by screws 11 a bracket 12 fabricated from sheet metal.

Within the body 5, there is provided a butterfly disc 13 which is constituted by two parallel disc portions 14,15 separated from one another by an opening 16. The butterfly disc 13 is rotatable between the open position shown in FIG. 1 of the drawings in which the disc is aligned with the passageway, and a closed position shown in FIGS. 2 and 3 in which the butterfly disc 13 extends across the passageway 6. As can be seen from FIG. 1 of the drawings, when the valve is open, the opening 16 between the disc portions 14,15, and the openings 17 and 18 between each disc portion and the side of the body form three portions of the passageway 6 which are of approximately equal cross-sectional area for the flow of fluid over the passageway 6.

The butterfly disc 13 is mounted for rotation upon a shaft 20 which extends from the top of the disc 13 as viewed in the drawings through the body 5 and the bracket 12 to the exterior of the body where its upper end 21 is fixed by a screw 22 to an operating handle 23 which can rotate the shaft 20 and thence the butterfly disc 13. The operating handle 23 is provided with a flange 24 cooperating with a set-screw 25 to determine the ends of rotation of the handle 23, and thereby the open and shut positions of the butterfly disc 13. The shaft 20 is sealed to the upper extension 10 of the body 5 by a gland 30 held in position by nuts 31 threaded on bolts 32 passing through the bracket 12 into the upper extension 10. The gland 30 compresses packing material 33 against the shaft 20 and the upper extension 10. Just below the upper plate 34 of the bracket 12, the shaft is reduced in diameter to provide a shoulder 35 which is incapable of passing through the plate 34 and thereby prevents expulsion of the shaft 20 from the body by pressure within the passageway 6.

The end of the shaft 20 adjacent the butterfly disc 13 has two opposite sides milled flat, and is received in a slot 40 formed in the butterfly disc at right-angles to the plane thereof. As can be seen particularly from FIG. 3 of the drawings, the slot 40 is longer than the diameter of the shaft 20 whereby when the valve is closed with the disc 13 across the passageway, the slot is aligned with the passageway and the disc can be displaced along the passageway to a small degree. The amount of displacement is controlled by a cylindrical projection 41 formed on the shaft 20 extending beyond the slot 40 into a cylindrical aperture 42 in the disc.

Both location and rotation of the butterfly disc 13 are provided by the shaft 20 at the upper end of the disc, and further location is provided at the lower end of the disc by a spigot 45 which is diametrically opposite the slot 41 and is co-axial with the shaft 20. The spigot 45 is rotatably mounted in the body 5, and is sealed from the exterior by a plug 46 screwed into the cylindrical boss 9. The spigot 45 is provided with milled flats 47 similar to those formed on the shaft 20 which are received by a slot 48' formed in the butterfly disc 13 and identical with the slot 40 on the opposite side thereof. The spigot 45 is also provided with a cylindrical extension 49 identical to the cylindrical extension 41 of the shaft 20, and this is received in a cylindrical aperture 50 identical to the cylindrical aperture 42. As the butterfly disc 13 is rotated by the shaft, the disc 13 will turn the spigot 45, and when the disc closes the passageway 6, the slot 48 which is parallel with the slot 40 permits the disc to be displaced along the passageway to a degree controlled by the tolerance between the cylindrical extension 49 and the cylindrical aperture 50.

Means are provided for sealing the butterfly disc 13 to the body 5 when the valve is to be closed. These means comprise a frusto-spherical face 55 formed on each side of the butterfly disc 13, that is to say, one for each of the disc portions 14,15. The faces 55 are annular so as to extend all the way around each side of the butterfly disc, and thereby seal the disc irrespective of the direction of pressure applied thereto by fluid which would otherwise pass through the passageway 6.

The annular faces 55 cooperate with corresponding seatings one to each side of the butterfly disc, the seatings being formed on the body 5. Each seating comprises a metallic ring 60 which is screwed into and lies flush with the corresponding faces 7 or 8 of the body 5. Each metallic ring 60 also mounts a ring 61 of plastic material, preferably ptfe, which is trapped thereby against the body and of which the inner surface lies approximately contiguously with the inner surface of the metallic ring 60. Each metallic ring 60 and plastic ring 61 constitutes an annular seating on the body for the corresponding face 55 on the butterfly disc, the inner surface of the seating preferably being frusto-conical.

In operation, the butterfly disc is rotated between open and closed positions via the shaft 20 by the handle 23. When the disc is in the closed position, as shown in FIGS. 2 and 3, the annular faces 55 on the disc portions 14,15 seal with the plastic rings 61 to close and seal the passageway 6. In the event that the valve is subjected to high temperature, for example above about 250°C when ptfe will lose its effectiveness and will be destroyed, the removal thereof allows the butterfly disc 13 to be displaced along the passageway under the influence of the pressure exerted thereon by the fluid in the passageway 6, and the downstream face 55 will seat against the downstream metallic ring 60. The valve will thereby still be able to close the passageway 6.

It will be appreciated that the metallic rings 60 can be unscrewed from the body 5 and the plastic rings 61 can thereby be removed and replaced, and the butterfly disc can be disassembled from the body 5.

The metallic rings 60 are preferably of stainless steel, but they may be of another metal which may be faced with stainless steel or another hard metal facing. The faces 55 on the butterfly disc 13 may be flame-hardened and may alternatively be coated with stainless steel or another hard metal.

Figure 4:
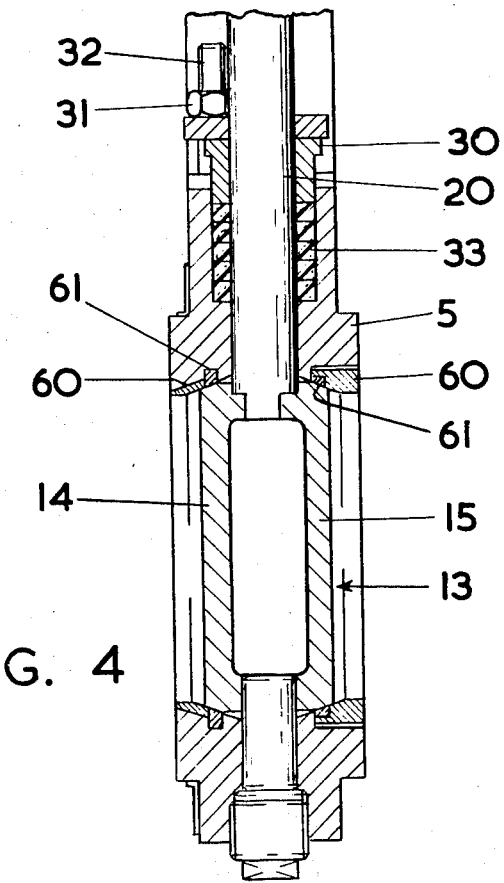
FIG. 4 is a view similar to that of FIG. 3 in which the valve is simplified, and incorporating a modification of the valve of the other drawings.

Referring now to FIG. 4 of the drawings, this shows a view similar to that of FIG. 3 in which only one of the metallic rings 60 is removable. The other metallic ring is fixed to the body 5, and the associated plastic ring can be snap-fitted into a recess located adjacent the ring, and partly defined thereby. In this case disassembly of the one removable metallic ring 60 still permits disassembly of the disc, and the plastic rings 61 adjacent the metallic rings can still be replaced. The other parts of the valve shown in FIG. 4 will normally be the same as those shown in the other drawings.

I claim:

1. A self-sealing fluid flow control valve comprising a body having a passageway therethrough, a butterfly disc means mounted in said body for rotation to and from a position closing said passageway and for limited axial displacement under the pressure of fluid in the passageway along the passageway, the body and the butterfly disc being provided with two sets of annular sealing seatings and faces, one set being located to each side of the butterfly disc, each set being formed by a seating on the body and a face on the disc, the seating and face of each set being arranged to seal together when the butterfly disc closes the passageway, at least one of said seatings being formed of two side-by-side annular portions of which one portion is resilient material and the other portion is metallic, said two annular portions being arranged such that in a normal closed position of the valve the face on the disc seals with said resilient annular portion of said seating and such that, in the event of said resilient annular portion being destroyed, the disc becomes displaced toward said seating by fluid pressure a distance less than said limited displacement and the face on the disc seals with said metallic annular portion.

2. A valve according to claim 1 wherein the butterfly disc is a double disc of two parallel disc portions separated from one another by an opening constituting part of the passageway when the valve is open.

3. A valve according to claim 1 wherein the butterfly disc is rotatable by a shaft extending from the disc through the body to the exterior thereof and coupled to rotation means.

4. A valve according to claim 3 wherein the butterfly disc is provided with a slot receiving a complementarily shaped end portion of the shaft, the slot being aligned with the passageway when the butterfly disc is closing the passageway and permitting displacement of the disc along the passageway for sealing to be effective and to close the passageway even if one of the dissimilar materials is destroyed.

5. A valve according to claim 4 wherein the diametrically opposite side of the butterfly disc from the shaft is connected to a spigot rotatably mounted in the body.

6. A valve according to claim 5 wherein the connection between the butterfly disc and the spigot is similar to said slot and complementarily shaped portion of the shaft and permits displacement of the disc along the passageway when the butterfly disc is closing the passageway for sealing to be effective and to close the passageway even if one of the dissimilar materials is destroyed.

7. A valve according to claim 3 wherein the shaft is provided with means preventing the expulsion thereof from the body by pressure within the passageway.

8. A valve according to claim 7 wherein said means on the shaft comprises a shoulder thereon cooperating with part of the body.

9. A valve as in claim 1 wherein the annular metallic portion of the seating is a metallic ring which is secured in the body and which mounts the annular resilient portion of the seating, said resilient portion being constructed of plastic material.

10. A valve as in claim 9 wherein the plastic material is polytetrafluoroethylene.

11. A valve as in claim 1 wherein both of the seatings are constructed of a metallic and an annular plastic portion mounted by its respective ring, one of the rings being fixed to the body and the other ring being removably secured to the body.

* * * * *